United States Patent
Seok

(10) Patent No.: US 8,948,102 B2
(45) Date of Patent: Feb. 3, 2015

(54) CHANNEL ACCESS METHOD FOR VERY HIGH THROUGHPUT (VHT) WIRELESS LOCAL ACCESS NETWORK SYSTEM

(75) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 306 days.

(21) Appl. No.: 13/201,844

(22) PCT Filed: Aug. 7, 2009

(86) PCT No.: PCT/KR2009/004414
§ 371 (c)(1),
(2), (4) Date: Sep. 27, 2011

(87) PCT Pub. No.: WO2010/095793
PCT Pub. Date: Aug. 26, 2010

(65) Prior Publication Data
US 2012/0014336 A1   Jan. 19, 2012

Related U.S. Application Data

(60) Provisional application No. 61/153,301, filed on Feb. 18, 2009.

(51) Int. Cl.
| | |
|---|---|
| *H04W 4/00* | (2009.01) |
| *H04W 74/08* | (2009.01) |
| *H04L 5/00* | (2006.01) |
| *H04L 25/02* | (2006.01) |
| *H04W 72/04* | (2009.01) |

(52) U.S. Cl.
CPC ......... *H04W 74/0816* (2013.01); *H04L 5/0007* (2013.01); *H04L 5/0023* (2013.01); *H04L 5/005* (2013.01); *H04L 5/0053* (2013.01); *H04L 25/0224* (2013.01); *H04W 72/0406* (2013.01)
USPC ............................ 370/329; 370/312; 370/432

(58) Field of Classification Search
USPC .......... 370/338, 465, 329, 389; 455/450, 126, 455/127.1; 375/260
See application file for complete search history.

(56) References Cited

U.S. PATENT DOCUMENTS

| | | | | |
|---|---|---|---|---|
| 2006/0280154 | A1* | 12/2006 | Kwon et al. | 370/338 |
| 2007/0160040 | A1 | 7/2007 | Kwon | |
| 2009/0046768 | A1* | 2/2009 | Pare, Jr. | 375/220 |
| 2010/0040158 | A1* | 2/2010 | Aggarwal et al. | 375/260 |
| 2010/0260159 | A1* | 10/2010 | Zhang et al. | 370/338 |
| 2010/0272032 | A1* | 10/2010 | Sayana et al. | 370/329 |

FOREIGN PATENT DOCUMENTS

| | | |
|---|---|---|
| KR | 100678939 | 2/2007 |
| WO | 2006025680 | 3/2006 |

\* cited by examiner

*Primary Examiner* — Andrew Lai
*Assistant Examiner* — Jamaal Henson
(74) *Attorney, Agent, or Firm* — Lee, Hong, Degerman, Kang & Waimey

(57) ABSTRACT

A channel access method for a very high throughput (VHT) system using a bonding channel having a plurality of subchannels is provided. The method includes receiving training information comprising a training offset value through a subchannel, performing channel estimation on a full channel bandwidth comprising all subchannels when a time corresponding to the training offset value is elapsed after the training information is received, transmitting a request to send (RTS) frame to a destination station through some subchannels selected from the plurality of subchannels by one or a plurality of source stations according to a result of the channel estimation, and transmitting a clear to send (CTS) frame to one source station selected from the plurality of source stations by the destination station in response to the received RTS frame. Accordingly, an effective channel access mechanism is provided for the VHT system, and collision among stations can be avoided.

10 Claims, 6 Drawing Sheets

CHANNEL ACCESS METHOD FOR VERY HIGH THROUGHPUT (VHT) WIRELESS LOCAL ACCESS NETWORK SYSTEM

CROSS-REFERANCE TO RELATED APPLICATIONS

This application is the National Stage filing under 35 U.S.C. 371 of International Application No. PCT/KR2009/004414, filed on Aug. 7, 2009, which claims the benefit of U.S. Provisional Application Ser. No. 61/153,301, filed on Feb. 18, 2009, the contents of which are all hereby incorporated by reference herein in their entirety.

TECHNICAL FIELD

The present invention relates to a wireless local access network (WLAN), and more particularly, to a channel access mechanism for a very high throughput (VHT) WLAN system and a station supporting the channel access mechanism.

BACKGROUND ART

With the advancement of information communication technologies, various wireless communication technologies have recently been developed. Among the wireless communication technologies, a wireless local access network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point (AP) protocol compatibility, security enhancement, radio resource measurement, wireless access in vehicular environments, fast roaming, mesh networks, inter-working with external networks, wireless network management, etc.

In the IEEE 802.11, the IEEE 802.11b supports a data rate of up to 11 Mbps by using a frequency band of 2.4 GHz. The IEEE 802.11a commercialized after the IEEE 802.11b uses a frequency band of 5 GHz instead of the frequency band of 2.4 GHz and thus significantly reduces influence of interference in comparison with the very congested frequency band of 2.4 GHz. In addition, the IEEE 802.11a has improved the data rate to up to 54 Mbps by using the OFDM technology. Disadvantageously, however, the IEEE 802.11a has a shorter communication distance than the IEEE 802.11b. Similarly to the IEEE 802.11b, the IEEE 802.11g implements the data rate of up to 54 Mbps by using the frequency band of 2.4 GHz. Due to its backward compatibility, the IEEE 802.11g is drawing attention, and is advantageous over the IEEE 802.11a in terms of the communication distance.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing speed of up to 540 Mbps at a frequency band of 5 GHz, and is based on a multiple input and multiple output (MIMO) technique which uses multiple antennas in both a transmitter and a receiver to minimize a transmission error and to optimize a data rate. In addition, this standard may use a coding scheme which transmits several redundant copies to increase data reliability and also may use the OFDM to support a higher data rate.

Meanwhile, a basic access mechanism of IEEE 802.11 medium access control (MAC) is a carrier sense multiple access with collision avoidance (CSMA/CA) combined with binary exponential backoff. The CSMA/CA mechanism is also referred to as a distributed coordinate function (DCF) of the IEEE 802.11 MAC mechanism, and basically employs a "listen before talk" access mechanism. In this type of access mechanism, a station (STA) listens a wireless channel or medium before starting transmission. As a result of listening, if it is sensed that the medium is not in use, a listening STA starts its transmission. Otherwise, if it is sensed that the medium is in use, the STA does not start its transmission but enters a delay duration determined by the binary exponential backoff algorithm.

The CSMA/CA mechanism also includes virtual carrier sensing in addition to physical carrier sensing in which the STA directly listens the medium. The virtual carrier sensing is designed to compensate for a limitation in the physical carrier sensing such as a hidden node problem. For the virtual carrier sending, the IEEE 802.11 MAC mechanism uses a network allocation vector (NAV). The NAV is a value transmitted by an STA, currently using the medium or having a right to use the medium, to another STA to indicate a remaining time before the medium returns to an available state. Therefore, a value set to the NAV corresponds to a duration reserved for the use of the medium by an STA transmitting a corresponding frame.

One of procedures for setting the NAV is a exchange procedure of a request to send (RTS) frame and a clear to send (CTS) frame. The RTS frame and the CTS frame include information capable of delaying transmission of frames from receiving STAs by reporting upcoming frame transmission to the receiving STAs. The information may be included in a duration filed of the RTS frame and the CTS frame. After performing the exchange of the RTS frame and the CTS frame, a source STA transmits a to-be-transmitted frame to a destination STA.

FIG. 1 is a diagram showing an IEEE 802.11 MAC architecture including a DCF. Referring to FIG. 1, a service of the DCF is used to provide a point coordination function (PCF) and a hybrid coordination function (HCF). The HCF includes enhanced distributed channel access (EDCA) and HCF controller channel access (HCCF). The HCF does not exist in an STA not supporting quality of service (QoS). On the other hand, both the DCF and the HCF exist in an STA supporting QoS. The PCF is an arbitrary function in all STAs. Details of the DCF, PCF, EDCA, and HCCF are disclosed in section 9 of the "MAC sublayer function description" in the IEEE 802.11-REVma/D9.0 Oct. 2006 standard, and thus descriptions thereof will be omitted herein. The contents of the above standard are incorporated herein by reference.

DISCLOSURE OF INVENTION

Technical Problem

With the widespread use of a wireless local access network (WLAN) and the diversification of applications using the WLAN, there is a recent demand for a new WLAN system to support a higher throughput than a data processing speed supported by the institute of electrical and electronics engineers (IEEE) 802.11n. However, an IEEE 802.11n medium access control (MAC)/physical layer (PHY) protocol is not effective to provide a throughput of 1 Gbps or more. This is because the IEEE 802.11n MAC/PHY protocol is designed for an operation of a single station (STA), that is, an STA having one network interface card (NIC), and thus when a frame throughput is increased while maintaining the conventional IEEE 802.11n MAC/PHY protocol, a resultant additional overhead is also increased. Consequently, there is a limitation in increasing a throughput of a wireless communication network while maintaining the conventional IEEE 802.11n MAC/PHY protocol, that is, a single STA architecture.

Therefore, to achieve a data processing speed of 1 Gbps or more in the wireless communication system, a new system different from the conventional IEEE 802.11n MAC/PHY protocol (i.e., single STA architecture) is required. A very high throughput (VHT) system is a next version of the IEEE 802.11n WLAN system, and is one of IEEE 802.11 WLAN systems which have recently been proposed to support a data processing speed of 1 Gbps or more in a MAC service access point (SAP). The VHT system is named arbitrarily. To provide a throughput of 1 Gbps or more, a feasibility test is currently being conducted for the VHT system using 4×4 multiple input multiple output (MIMO) and a channel bandwidth of 80 MHz.

Meanwhile, a data processing speed of 1 Gbps or more, which is set as a target throughput in a VHT system, denotes an aggregate throughput. On the other hand, a target throughput in one-to-one communication between STAs is at least 500 Mbps in the VHT system. This implies that performance or an offered load of an STA supporting VHT (hereinafter, simply referred to as a 'VHT STA') may not exceed 500 Mbps. In a case where the offered load of the VHT STA is less than 1 Gbps (e.g., 500 Mbps), the target throughput of the VHT system cannot be achieved when one VHT STA is allowed to use an entire channel similarly to the conventional channel access mechanism.

In addition, there is a problem in that efficiency is not high in the aforementioned carrier sense multiple access with collision avoidance (CSMA/CA) channel access mechanism used in the IEEE 802.11 WLAN. For example, a data processing speed in a MAC SAP is only 50 to 60 ? of a data processing speed in a PHY SAP. Therefore, in order to achieve a data processing speed of 1 Gbps or more in the MAC SAP of the VHT system, the data processing speed of the PHY SAP needs to be about 1.5 to 2 times higher than 1 Gbps. However, the conventional IEEE 802.11n PHY technique has difficulty in providing such a processing speed.

In order to solve the aforementioned problems, the present invention provides a new channel access mechanism for achieving an aggregate throughput of 1 Gbps or more in a VHT system.

The present invention also provides a channel access mechanism for allowing simultaneous channel access of a plurality of VHT stations (STAs) in a VHT system.

The present invention also provides a new channel access mechanism for achieving an aggregate throughput of 1 Gbps or more in a MAC SAP of a VHT system.

The present invention also provides a mechanism whereby STAs can use MIMO (or multi-user MIMO) in a full channel bandwidth.

The present invention also provides a mechanism whereby a channel estimation process can be performed without collision for a full channel bandwidth.

Technical Solution

According to an aspect of the present invention, a channel access method for a very high throughput (VHT) system using a bonding channel having a plurality of subchannels is provided. The method includes receiving training information comprising a training offset value through a subchannel; performing channel estimation on a full channel bandwidth comprising all subchannels when a time corresponding to the training offset value is elapsed after the training information is received; transmitting a request to send (RTS) frame to a destination station through some subchannels selected from the plurality of subchannels by one or a plurality of source stations according to a result of the channel estimation; and transmitting a clear to send (CTS) frame to one source station selected from the plurality of source stations by the destination station in response to the received RTS frame.

Advantageous Effects

According to an embodiment of the present invention, an effective channel access mechanism is provided to improve usage efficiency of a bonding channel having a plurality of subchannels in a very high throughput (VHT) system using the bonding channel. In particular, according to an embodiment of the present invention, multiple input multiple output (MIMO) or multi-used MIMO can be used by stations (STAs) in a full channel bandwidth, and a required channel estimation process for the full channel bandwidth can be performed without collision among the STAs.

MODE FOR THE INVENTION

Hereinafter, exemplary embodiments of the present invention will be described in detail with reference to the accompanying drawings.

Figure 1:
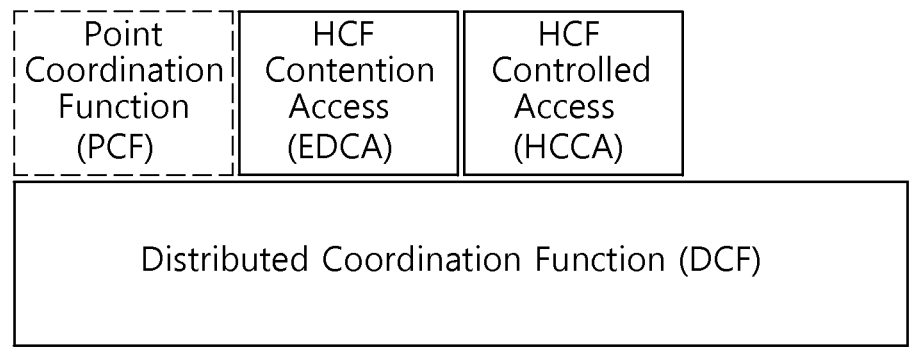
FIG. 1 is a diagram showing an institute of electrical and electronics engineers (IEEE) 802.11 medium access control (MAC) architecture including a distributed coordinate function (DCF).
Figure 2:
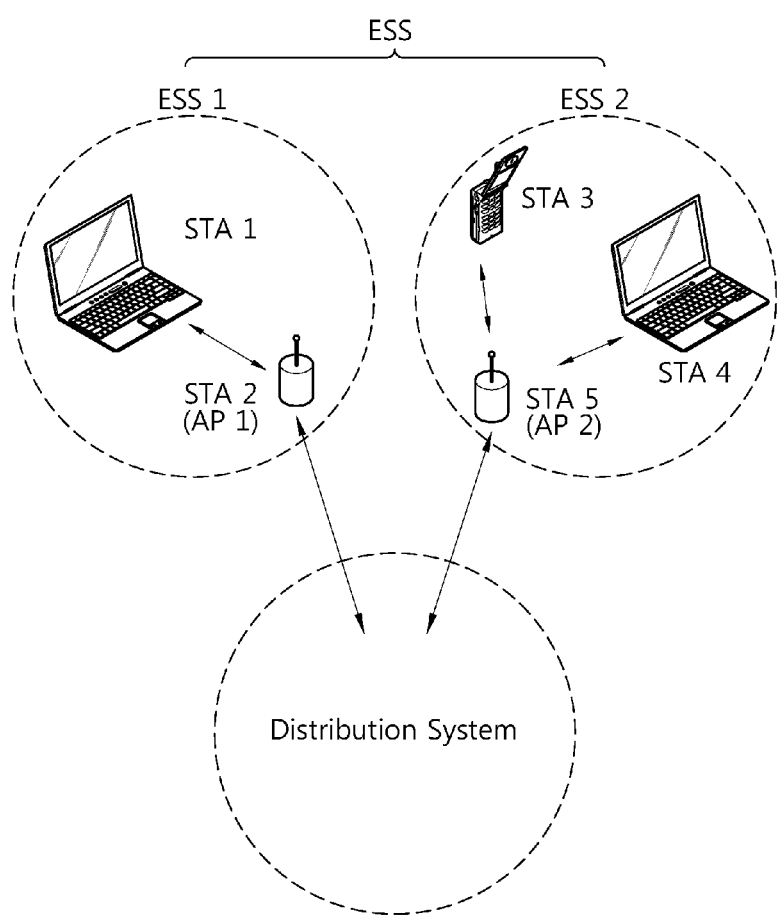
FIG. 2 is a schematic view showing an exemplary structure of a wireless local access network (WLAN) system according to an embodiment of the present invention.

FIG. 2 is a schematic view showing an exemplary structure of a wireless local access network (WLAN) system according to an embodiment of the present invention.

Referring to FIG. 2, the WLAN system includes one or more basis service sets (BSSs). The BSS is a set of stations (STAs) which are successfully synchronized to communicate with one another, and is not a concept indicating a specific region. A very high throughput (VHT) BSS is defined as a BSS that supports a super high-speed data processing of 1 GHz or more.

A VHT system including one or more VHT BSSs can use a channel bandwidth of 80 MHz, which is for exemplary purposes only. For example, the VHT system may use a channel bandwidth of 60 MHz or 100 MHz or more. As such, the VHT system operates in a multi-channel environment where a plurality of subchannels having a specific size, e.g., a channel bandwidth of 20 MHz, are included.

The BSS can be classified into an infrastructure BSS and an independent BSS (IBSS). The infrastructure BSS is shown in FIG. 2. Infrastructure BSSs (i.e., BSS1 and BSS2) include one or more STAs (i.e., STA 1, STA 3, and STA 4), access points (APs) which are STAs providing a distribution service, and a distribution system (DS) connecting a plurality of APs (i.e., AP 1 and AP 2). On the other hand, the IBSS does not include APs, and thus all STAs are mobile STAs. In addition, the IBSS constitutes a self-contained network since connection to the DS is not allowed.

The STA is an arbitrary functional medium including a medium access control (MAC) and wireless-medium physical layer (PHY) interface conforming to the institute of electrical and electronics engineers (IEEE) 802.11 standard, and includes both an AP and a non-AP STA in a broad sense. A VHT STA is defined as an STA that supports the super high-speed data processing of 1 GHz or more in the multi-channel environment to be described below.

The STA for wireless communication includes a processor and a transceiver, and also includes a user interface, a display means, etc. The processor is a functional unit devised to generate a frame to be transmitted through a wireless network or to process a frame received through the wireless network, and performs various functions to control STAs. The transceiver is functionally connected to the processor and is a functional unit devised to transmit and receive a frame for the STAs through the wireless network.

Among the STAs, non-AP STAs (i.e., STA 1, STA 3, STA 4, STA 6, STA 7, and STA 8) are portable terminals operated by users. A non-AP STA may be simply referred to as an STA. The non-AP STA may also be referred to as a wireless transmit/receive unit (WTRU), a user equipment (UE), a mobile station (MS), a mobile terminal, a mobile subscriber unit, etc. A non-AP VHT-STA is defined as a non-AP STA that supports the super high-speed data processing of 1 GHz or more in the multi-channel environment to be described below.

The AP (i.e., AP 1 and AP 2) is a functional entity for providing connection to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. A VHT AP is defined as an AP that supports the super high-speed data processing of 1 GHz or more in the multi-channel environment to be described below.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical structure for interconnecting APs.

Figure 3:
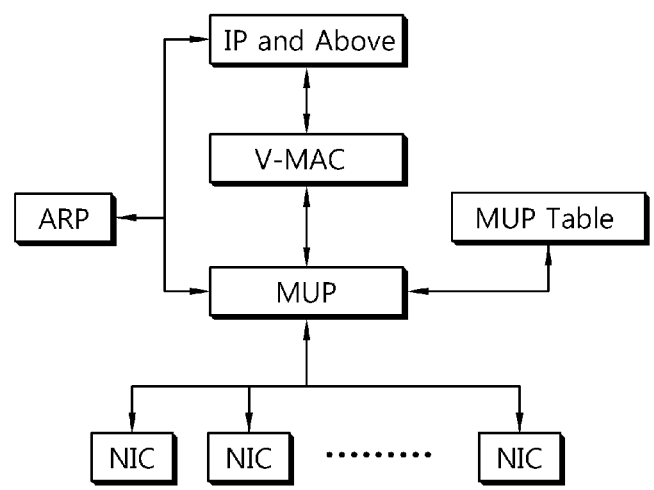
FIG. 3 is a block diagram showing a multi-radio unification protocol (MUP) as an example of a protocol applicable to a very high throughput (VHT) system including a plurality of network interface cards (NICs) each having an independent radio interface.

FIG. 3 is a block diagram showing a multi-radio unification protocol (MUP) as an example of a protocol applicable to a VHT system including a plurality of network interface cards (NICs) each having an independent radio interface.

Referring to FIG. 3, an STA supporting the MUP includes a plurality of NICs. The NICs are separately depicted in FIG. 3, which implies that each NIC independently operates a MAC/PHY module. That is, the NICs are distinctively depicted in FIG. 3 to show that the NICs are logical entities operating according to individual MAC/PHY protocols. Therefore, the plurality of NICs can be implemented with physically distinctive functional entities, or can be implemented by integrating the physical entities into one physical entity.

According to one aspect of the present embodiment, the plurality of NICs can be classified into a primary radio interface and one or more secondary radio interfaces. If a plurality of secondary radio interfaces are present, the secondary radio interfaces can be classified into a first secondary radio interface, a second secondary radio interface, a third secondary radio interface, etc. The classification into the primary interface and the secondary interface and/or the classification of the secondary ratio interface itself may be determined by a policy or may be adoptively determined in consideration of a channel environment.

The plurality of NICs are integrally managed according to the MUP. As a result, the plurality of NICs are externally recognized as if they are one device. For this, the VHT system includes a virtual-MAC (V-MAC). Through the V-MAC, an upper layer cannot recognize that a multi-radio channel is operated by the plurality of NICs. As such, in the VHT system, the upper layer does not recognize the multi-radio channel through the V-MAC. This means that one virtual Ethernet address is provided.

Next, a channel allocation mechanism in a VHT system will be described according to embodiments of the present invention. Although the embodiments described below relate to a VHT system using a bonding channel in which contiguous 4 subchannels having a bandwidth of 20 MHz are combined (i.e., a bonding channel having a channel bandwidth of 80 MHz), this is for exemplary purposes only. The embodiments described below can equally apply to a VHT system including a plurality of subchannels (e.g., 3 or 5 or more subchannels), which is apparent to those skilled in the art. In addition, the embodiments of the present invention are not limited to the VHT system whose subchannel has a bandwidth of 20 MHz.

Figure 4:
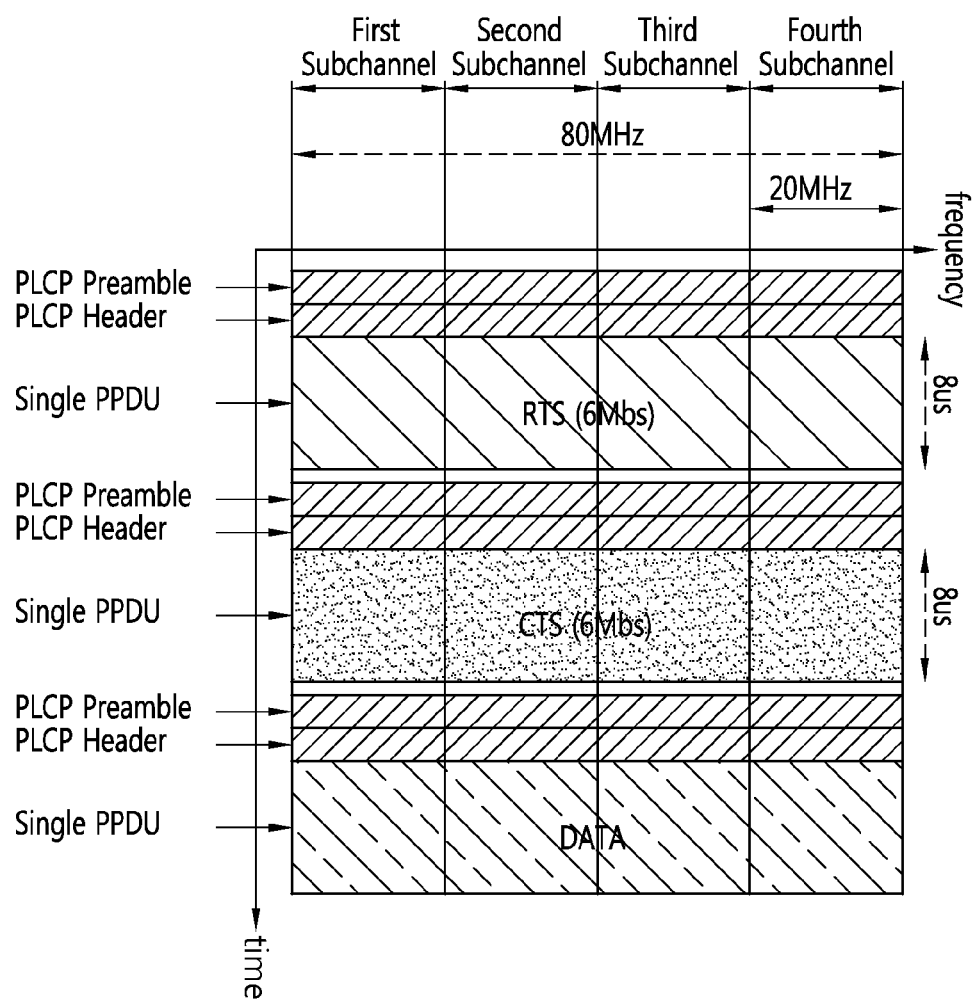
FIG. 4 is a diagram showing an example of a channel access mechanism.

FIG. 4 is a diagram showing an example of a channel access mechanism in a VHT WLAN system. In the present embodiment, the conventional channel access mechanism (e.g., enhanced distributed channel access (EDCA) mechanism) is directly used for an entire bonding channel, and it is assumed that a full channel bandwidth is used by only one VHT STA. That is, the entire bonding channel is used to exchange a request to send (RTS) frame, a clear to send (CTS) frame, and data between two VHT STAs communicating with each other.

Referring to FIG. 4, a source VHT STA or a transmitting VHT STA, which intends to transmit data, transmits an RTS frame by using the entire bonding channel. In FIG. 4, a process of transmitting the RTS frame is indicated by a physical layer convergence procedure (PLCP) preamble, a PLCP header, and a single PLCP protocol data unit (PPDU).

Upon receiving the RTS frame, a destination VHT STA or a receiving VHT STA transmits a CTS frame also by using the entire bonding channel. In FIG. 4, a process of transmitting the CTS frame is also indicated by a PLCP preamble, a PLCP header, and a single PPDU.

When the RTS frame and the CTS frame are exchanged by using the entire bonding channel, subsequent data or the like is generally transmitted also by using the entire bonding channel. However, according to one aspect of the present embodiment, the RTS frame and/or the CTS frame may include a list of subchannels to be used for transmission of subsequent data or the like. As such, when the RTS frame and/or the CTS frame include the list of subchannels, a network allocation vector (NAV) is set only for a specific subchannel included in the list, and the source VHT STA transmits the data or the like to the destination VHT STA only through the specific subchannel.

Consequently, upon receiving the CTS frame, the source VHT STA starts transmission of the data or the like to the destination VHT STA according to a predetermined procedure. In FIG. 4, a process of transmitting the data is also indicated by a PLCP preamble, a PLCP header, and a single PPDU. In this case, if the list of subchannels does not exist in the RTS frame and/or the CTS frame, as shown in FIG. 4, the data or the like is transmitted by using the entire bonding channel. Otherwise, if the list of subchannels exists, the data or the like may be transmitted by using all or some of subchannels included in the list.

As described above, according to the embodiment of the present invention, the RTS frame, the CTS frame, the data frame, etc., are transmitted through the entire bonding channel directly using the channel access mechanism based on the conventional EDCA. As a modification of the embodiment, the list of subchannels to be used for transmission of the data frame or the like may be included in the RTS frame and/or the CTS frame. If the list of subchannels is included, the source VHT STA can transmit the data frame or the like to the destination VHT STA by using all or some of subchannels in the list.

In a case where the RTS frame and the CTS frame are transmitted by using the entire bonding channel, the RTS frame and the CTS frame are very small in size, and thus a transmission time corresponds to only a few orthogonal frequency division multiplex (OFDM) symbols (e.g., 8 ?s required for transmission of 6 Mbs). Optionally, the transmission time of the RTS frame and the CTS frame may be less than the PLCP preamble and the PLCP header. A network overhead for the RTS frame and the CTS frame is almost negligible.

According to the present embodiment, when collision occurs with the legacy STA, the entire bonding channel cannot be used, which may result in significant deterioration in a throughput of the VHT system. If one or more legacy STAs simultaneously operate in any one subchannel among a plurality of subchannels used or to be used by a VHT STA, all subchannels constituting the channel or the bonding channel must be in an idle state in order for the VHT STAT to access to a channel including the subchannel or the entire bonding channel. That is, the VHT STA can successfully perform channel access when there is no collision with the legacy STA with respect to all subchannels constituting the bonding channel.

In addition, according to the present embodiment, when the legacy STA occupies any one subchannel at a time of transmitting the RTS frame, even if the use of the subchannel is finished some time later, the VHT STA cannot transmit data or the like by directly using the entire bonding channel. That is, only after the use of the subchannel by the legacy STA is finished, an exchange process of the RTS frame and the CTS frame can start.

Figure 5:
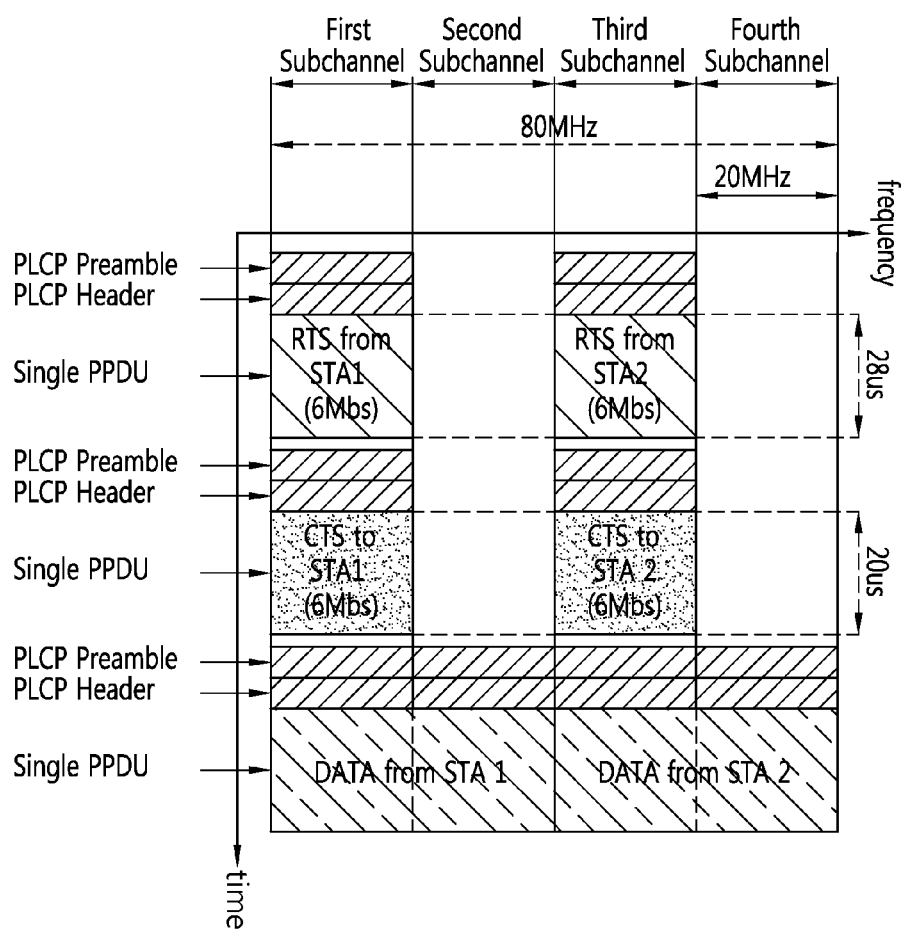
FIG. 5 is a diagram showing another example of a channel access mechanism.

FIG. 5 is a diagram showing another example of a channel access mechanism in a VHT WLAN system. The present embodiment is an example of a channel access mechanism for preventing collision among VHT STAs in a VHT system in which a VHT STA coexists with a legacy STA or in a VHT BSS in which only a VHT STA exists. Such a channel access mechanism can also be referred to as, for example, frequency-hopping EDCA with dynamic channel allocation.

According to a channel access mechanism using a frequency-hopping EDCA scheme, a destination VHT STA can receive RTS frames simultaneously from a plurality of UEs, or can receive an additional RTS frame through a subchannel currently not used. In this case, according to the present embodiment, CRT frames are respectively transmitted to one or more UEs which have transmitted the RTS frames, and thus several UEs can simultaneously transmit data or the like through different subchannels. The CTS frame includes a list of subchannels to be used when a corresponding UE transmits data or the like.

Referring to FIG. 5, source VHT STAs or transmitting VHT STAs (indicated by 'STA 1' and 'STA 2' in FIG. 5), which intend to transmit data, transmit RTS frames through respective subchannels. For example, this may be a case where backoff timers of the STA 1 and the STA 2 are simultaneously expired.

When the backoff timers are expired, the VHT STAs transmit RTS frames. Only one subchannel is used in the transmission of the RTS frames. The subchannel can be selected in various manners. For example, the subchannel can be randomly selected. The VHT STAs attempt channel access by using the EDCA scheme.

For example, four subchannels of 20 MHz exist in a VHT system having a channel bandwidth of 80 MHz. The VHT STA transmits an RTS frame by randomly selecting one subchannel from the four subchannels.

As such, according to the present embodiment, RTS frames are transmitted by using only one subchannel, and thus even if a plurality of VHT STAs simultaneously transmit the RTS frames, collision among the RTS frames can be prevented or avoided. That is, as shown in FIG. 5, the backoff timers of the STA 1 and the STA 2 may be simultaneously expired, and subsequently the STA 1 and the STA 2 respectively transmit RTS frames. However, since the STA 1 and the STA 2 transmit the RTS frames through different subchannels, collision does not occur when the RTS frames are transmitted by the respective STAs.

It is shown in FIG. 5 that the STA 1 uses a 1st subchannel and the STA 2 uses a 3rd subchannel when the RTS frames are transmitted, which is for exemplary purposes only. According to the present embodiment, preferably, the STA 1 and the STA 2 transmit the RTS frames by using different subchannels, and the subchannels can be determined without any restriction.

That is, when the STA 1 and the STA 2 transmit the RTS frames by using different subchannels, collision among the RTS frames can be prevented. In FIG. 5, a process of transmitting the respective RTS frames by the STA 1 and the STA 2 through the different subchannels is indicated by a PLCP preamble, a PLCP header, and a single PPDU in the 1st and 3rd subchannels.

When the destination VHT STA or the receiving VHT STA receives separate RTS frames through the 1st and 3rd subchannels among all subchannels, the destination VHT STA or the receiving VHT STA transmits CTS frames in response to the all received RTS frames.

A CTS frame is transmitted through an entire bonding channel when the CTS frame is transmitted. By transmitting the CTS frame in such a manner, a channel load caused by transmission of the CTS frame can be reduce. However, if the CTS frame is transmitted through the entire bonding channel, the legacy STA cannot decode the CTS frame, and as a result, cannot set the NAV during a time period determined by the CTS frame. Accordingly, in the present embodiment, the CTS frame is transmitted by using one subchannel.

The CTS frame may be transmitted for each subchannel constituting the bonding channel.

In FIG. 5, in response to RTS frames received from a 1st VHT STA (i.e., STA 1) and a 2nd VHT STA (i.e., STA 2), two CTS frames are respectively transmitted to the STA 1 and the STA 2 through 1st and 3rd subchannels, which is for exemplary purposes only. That is, an AP receives two RTS frames in total from the STA 1 and the STA 2, and thereafter transmits CTS frames to the STA 1 and the STA 2 in response to the received RTS frames.

In FIG. 5, a process of transmitting the CTS frames is indicated by a PLCP preamble, a PLCP header, and a single PPDU in each of the 1st and 3rd subchannels.

In this case, the CTS frame may include a subchannel list to indicate for which subchannel a transmission opportunity is provided for each VHT STA. For example, if transmission is allowed for one VHT STA, a subchannel list that can be used by the VHT STA may be included in the CTS frame. If no subchannel list is included, the VHT STA may have a transmission opportunity for all subchannels.

According to the present embodiment, a list of subchannels to be used by the STA 1 to transmit subsequent data or the like is included in a CTS frame to be transmitted to the STA 1. According to the present invention, 1st and 2nd subchannels are included in the list, which is for exemplary purpose only. Likewise, a list of subchannels to be used by the STA 2 to transmit subsequent data or the like is also included in a CTS frame to be transmitted to the STA 2. According to the present embodiment, 3rd and 4th subchannels are included in the list, which is for exemplary purpose only.

Upon receiving the CTS frame, each of the STA 1 and the STA 2 transmits data or the like to the destination STA through a subchannel included in the subchannel list of the received CTS frame. The STA 1 and the STA 2 can simultaneously transmit the data or the like. In FIG. 5, a process of transmitting the data through 1st and 2nd subchannels of the 1st VHT STA and transmitting the data through 1st and 2nd subchannels of the 2nd VHT STA is indicated by a PLCP preamble, a PLCP header, and a single PPDU in the 1st and 2nd subchannels and the 3rd and 4th subchannels.

According to the embodiment of the present invention, a plurality of VHT STAs or a VHT STA and a legacy STA can transmit data or the like by using an entire bonding channel. In addition, according to the embodiment of the present invention in which a CTS frame includes a list of subchannels to be used, a VHT STA for using each subchannel can be adaptively determined by considering all conditions at the request of the plurality of VHT STAs. Therefore, according to the present embodiment, channel usage efficiency can be improved when transmitting data or the like.

Figure 6:
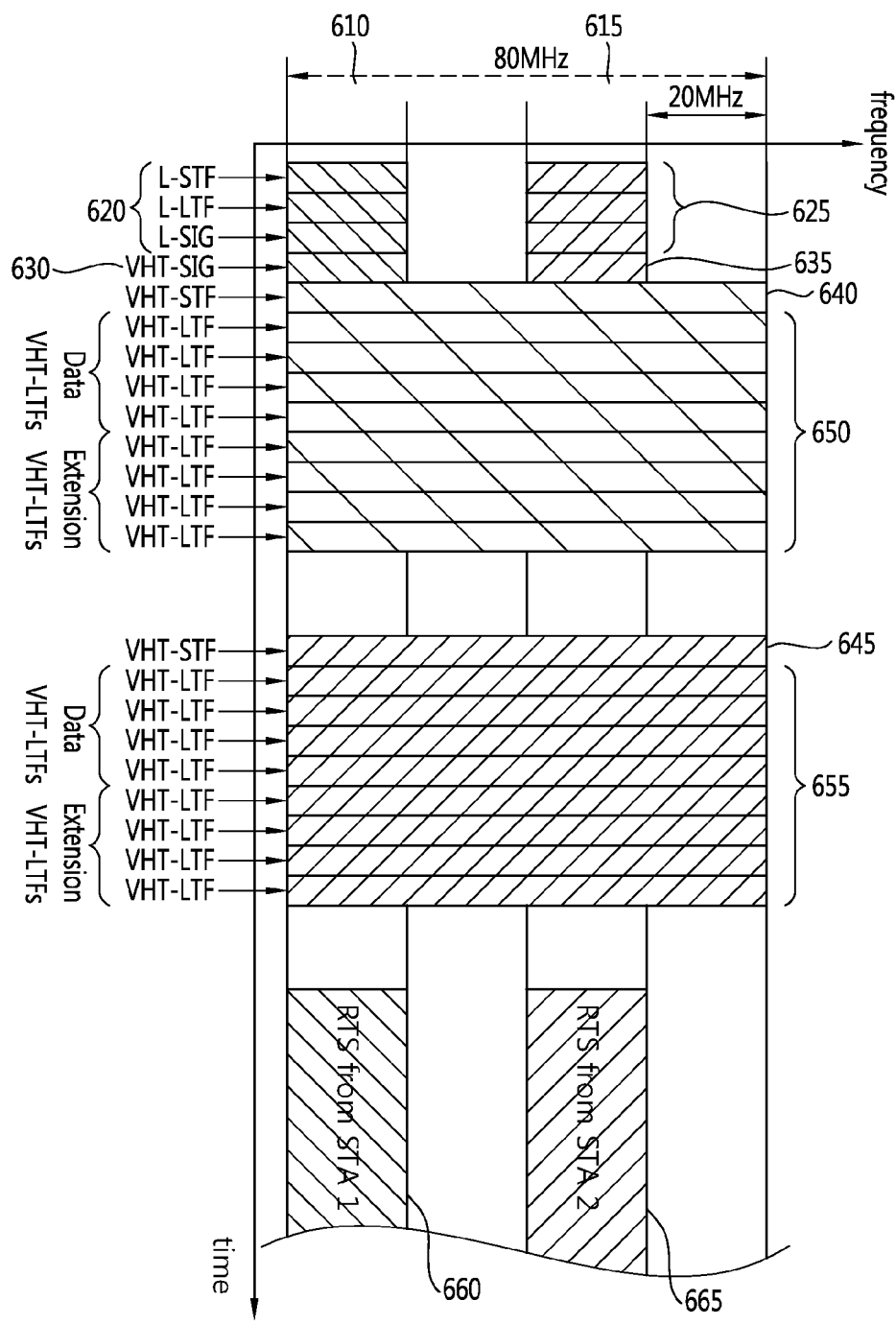
FIG. 6 shows a channel access method according to an embodiment of the present invention.

FIG. 6 shows a channel access method according to an embodiment of the present invention. In comparison with the example described with reference to FIG. 5, the channel access method of FIG. 6 further includes a channel estimation process. In FIG. 6, a PLCP frame format for the frequency-hopping EDCA scheme is proposed.

In order for STAs to use MIMO (or multi-user MIMO) in a full channel bandwidth (e.g., 80 MHz), the channel estimation process is required for the full channel bandwidth corresponding to a bonding channel. The channel access method proposed in the embodiment of the present invention includes the channel estimation process. Therefore, the STAs can use MIMO by using the channel access method including the channel estimation process according to the embodiment of the present invention.

According to the PLCP frame format proposed in the present embodiment, a short training field and a long training field for the full channel bandwidth corresponding to the bonding channel are transmitted after a specific training offset. The short training field and the long training field are transmitted through the bonding channel.

The PLCP frame format and the channel estimation process using the PLCP frame format will be described with reference to FIG. 6. Herein, channel access is performed by STAs conforming to the aforementioned frequency hopping EDCA scheme.

A legacy-short training field (L-STF), a legacy-long training field (L-LTF), and a legacy-signal (L-SIG) are respectively a short training field, a long training field, and a signal for a legacy STA. In addition, a VHT-short training field (VHT-STF), a VHT-Long Training Field (VHT-LTF), and a VHT-Signal (VHT-SIG) are respectively a short training field, a long training field, and a signal for a VHT STA.

If it is assumed that a bonding channel consists of four subchannels (i.e., 1st to 4th subchannels), an STA 1 and an STA 2 respectively use a 1st subchannel 610 and a 3rd subchannel 615 for example. The 1st subchannel 610 is used between an AP and the STA 1. The 3rd subchannel 615 is used between the AP and the STA 2. L-STF, L-LTF, and L-SIG sets 620 and 625 are transmitted respectively through the 1st subchannel 610 and the 3rd subchannel 615. Since the L-STF, L-LTF, and L-SIG set 620 and the L-STF, L-LTF, and L-SIG bundle set 625 are transmitted through different subchannels, they can be simultaneously transmitted. Subsequent to the transmission of the L-STF, L-LTF, and L-SIG sets 620 and 625, a VHT-SIG 630 and a VHT-SIG 635 are transmitted respectively to the STA 1 and the STA 2 through the 1st subchannel 610 and the 3rd subchannel 615.

The VHT-SIGs 630 and 635 include a training bandwidth value and a training offset value.

The training bandwidth value denotes a channel bandwidth to be used for transmission of VHT-STFs 640 and 645 and VHT-LTFs 650 and 655, that is, a channel bandwidth to be used for channel estimation. In the embodiment described with reference to FIG. 6, the STA 1 and the STA 2 transmit the VHT-STFs and VHT-LTFs 640, 645, 650, and 655 by using an entire bonding channel instead of any one subchannel. Therefore, in this case, a training bandwidth value included in the VHTSIGs 630 and 635 is 80 MHz. This is common to the VHT-SIG 630 transmitted by the STA 1 and the VHT-SIG 635 transmitted by the STA 2.

The training offset value denotes a time difference between a time when the VHTSIGs 630 and 635 are transmitted and a time when the VHT-STFs 640 and 645 and the VHT-LTFs 650 and 655 are transmitted. The training offset value may indicate positions of the VHT-STFs 640 and 645 and the VHT-LTFs 650 and 655 in a PLCP frame depicted along a time axis in FIG. 6.

For example, if the VHT-SIGs 630 and 635 have a training offset value of 0, the VHT-STFs 640 and 645 and the VHT-LTFs 650 and 655 are transmitted immediately after the VHT-SIGs 630 and 635 are transmitted.

If the VHT-SIGs 630 and 635 have a training offset value of 1, the VHT-STFs 640 and 645 and the VHT-LTFs 650 and 655 are transmitted when a time for transmitting one set of VHT-SIG, VHT-STF, and VHT-LTF is elapsed after the VHT-SIGs 630 and 635 are transmitted. This implies that another UE may transmit the VHT-STF and VHT-LTF in advance.

If the VHT-SIGs 630 and 635 have a training offset value of 2, the VHT-STFs 640 and 645 and the VHT-LTFs 650 and 655 are transmitted when a time for transmitting two sets of VHT-SIG, VHT-STF, and VHT-LTF is elapsed after VHT-SIG transmission. That is, a time for transmitting the VHT-SIG, VHT-STF, VHT-LTF, VHT-SIG, VHT-STF, and VHT-LTF corresponds to the training offset value of 2. This implies that two other UEs may transmit the VHT-STF and VHT-LTF in advance.

If the VHT-SIGs 630 and 635 have a training offset of 3, the VHT-STFs 640 and 645 and the VHT-LTFs 650 and 655 are transmitted when a time for transmitting three sets of VHT-SIG, VHT-STF, and VHT-LTF is elapsed after VHT-SIG transmission. That is, a time for transmitting the VHT-SIG, VHT-STF, VHT-LTF, VHT-SIG, VHT-STF, VHT-LTF, VHT-SIG, VHT-STF, and VHT-LTF corresponds to the training offset of 3. This implies that three other UEs may transmit VHT-STF and the VHT-LTF in advance.

As such, the training offset is differently set for each STA or for each subchannel, and thus it is possible to avoid collision among STAs that simultaneously access to a channel to perform the channel estimation process.

The training offset may be determined according to a subchannel selected by a STA or may be randomly determined by the STA.

By using the training offset, STAs simultaneously accessing a channel in the frequency-hopping EDCA process can perform the channel estimation process without collision for an entire bonding channel, i.e., a full channel bandwidth.

That is, after the STA 1 and the STA 2 transmit the VHT-SIGs 630 and 635 through the respective subchannels 610 and 615, the STA 1 first transmits the VHT-STF 640 and the VHT-LTF 650.

The L-STF, L-LTF, L-SIG, and VHT-SIG sets 630 and 635 are transmitted through the 1st subchannel 610 and the 3rd subchannel 615, and thereafter the VHT-STF 640 and the VHT-LTF 650 of the STA 1 are transmitted through the entire bonding channel. This process corresponds to a channel estimation process of the STA 1 for the full channel bandwidth. Thereafter, the VHT-STF 645 and the VHT-LTF 655 of the STA 2 are transmitted through the entire bonding channel. Likewise, this process corresponds to a channel estimation process of the STA 2 for the full channel bandwidth.

As described above, the STA 1 and the STA 2 perform channel estimation at a time depending on a training offset, and exchange an RTS frame and a CTS frame with an AP through a subchannel. The STA 1 transmits the RTS frame 660 through the 1st subchannel 610, and the STA 2 transmits the RTS frame 665 through the 3rd subchannel 615. Thereafter, as shown in FIG. 5, the STA 1 and the STA 2 transmit a data frame according to information included in the CTS frame.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for channel estimation at a receiver in a wireless local area network, the method comprising:
   receiving a Very High Throughput (VHT) signal field from a transmitter in a first bandwidth, the VHT signal field comprising a bandwidth field, a training offset field, and a position field, the bandwidth field indicating a second bandwidth, the position field indicating positions of a plurality of receivers;
   receiving at least one VHT-long training field (VHT-LTF) from the transmitter in the second bandwidth based on a position of the receiver; and
   estimating a multiple input multiple output (MIMO) channel based on the at least one VHT-LTF,
   wherein the training offset field is set to a first value when the least one VHT-LTF is destined to only one receiver, and the training offset field is set to a second value when the least one VHT-LTF is destined to the plurality of receivers.

2. The method of claim 1, wherein the first bandwidth is smaller than the second bandwidth.

3. The method of claim 2, wherein the first bandwidth is 20 MHz.

4. The method of claim 2, wherein the second bandwidth is 40 or 80 MHz.

5. The method of claim 1, wherein the transmitter is an access point (AP), and wherein the receiver is a non-AP station.

6. An apparatus operating in a wireless local area network, the apparatus comprising:
   a transceiver configured to transmit and receive radio signals; and
   a processor operatively coupled to the transceiver and configured to:
      receive a Very High Throughput (VHT) signal field from a transmitter in a first bandwidth, the VHT signal field comprising a bandwidth field, a training offset field, and a position field, the bandwidth field indicating a second bandwidth, the position field indicating positions of a plurality of receiving apparatuses;
      receive at least one VHT-long training field (VHT-LTF) from the transmitter in the second bandwidth based on a position of the apparatus; and
      estimate a multiple input multiple output (MIMO) channel based on the at least one VHT-LTF,
   wherein the training offset field is set to a first value when the least one VHT-LTF is destined to only one receiving apparatus and the training offset field is set to a second value when the least one VHT-LTF is destined to the plurality of receiving apparatuses.

7. The apparatus of claim 6, wherein the first bandwidth is smaller than the second bandwidth.

8. The apparatus of claim 7, wherein the first bandwidth is 20 MHz.

9. The apparatus of claim 8, wherein the second bandwidth is 40 or 80 MHz.

10. The apparatus of claim 6, wherein:
    the transmitter is an access point (AP); and
    the apparatus is a non-AP station.

* * * * *